United States Patent [19]
Schneier

[11] Patent Number: 5,850,516
[45] Date of Patent: Dec. 15, 1998

[54] METHOD AND APPARATUS FOR ANALYZING INFORMATION SYSTEMS USING STORED TREE DATABASE STRUCTURES

[76] Inventor: Bruce Schneier, 7115 W. Oak Park Ave., Oak Park, Ill. 60302

[21] Appl. No.: 772,413

[22] Filed: Dec. 23, 1996

[51] Int. Cl.$^6$ .................................................. G06F 11/00
[52] U.S. Cl. ...................... 395/186; 395/200.59; 707/9
[58] Field of Search .............................. 395/186, 187.01, 395/200.59, 284; 707/9; 380/23, 25

[56] References Cited

U.S. PATENT DOCUMENTS

| | | | |
|---|---|---|---|
| 5,542,024 | 7/1996 | Balint et al. | 395/161 |
| 5,630,076 | 5/1997 | Saulpaugh et al. | 395/284 |

OTHER PUBLICATIONS

Ken Wong and Steve Watt, *Managing Information Security*, Elsevier Science Publishers, 1990, Chapter 5.

K.M. Jackson and J. Hruska, *Computer Security Reference Book*, Butterworth–Heiman, 1992, Chapter 21.

Philip Fites and Martin Katz, *Information Systems Security*, Van Nostrand Reinhold, 1993, Chapter 3.

Zella Ruthberg and Harold Tipton, *Handbook of Information Security Management*, Auerbach Publishers, 1993, Chapter 1–3–1.

Zella Ruthberg and Harold Tipton, *Handbook of Information Security Management, 1994–95 Yearbook*, Auerbach, 1994, Chapter 1–3.

Bruce Schneier, *Applied Cryptography*, Wiley, 1996, pp. 65–68.

*Primary Examiner*—Albert DeCady
*Assistant Examiner*—Pierre Eddy Elisca
*Attorney, Agent, or Firm*—Joseph Yang; Skadden, Arps

[57] ABSTRACT

A computer-implemented method and apparatus electronically represent and quantify the security of a system as a logical tree structure including leaf nodes representing attacks against the system and intermediate nodes representing various logical combinations of attacks necessary to mount a successful overall attack. An indication of the overall security of the system is quantified in a value of a root node of the tree. The values of the various nodes can be Boolean or continuous, representing simple binary security attributes such as feasible/infeasible or more complicated attributes such as cost, time or probability. The nodes' attributes and values can also represent defenses as well as attacks. The attack trees can be used to calculate the cost, time or probability of an attack to list the security assumptions of a system, to compare competing systems, to evaluate system modifications, to perform security subsystem analysis, to allocate a security budget, and for many other uses.

76 Claims, 7 Drawing Sheets

METHOD AND APPARATUS FOR ANALYZING INFORMATION SYSTEMS USING STORED TREE DATABASE STRUCTURES

FIELD OF THE INVENTION

The method and apparatus of the present invention relate generally to electronically analyzing the security of systems and, more particularly, to evaluating the security of an information system against unauthorized attack.

BACKGROUND OF THE INVENTION

The problem is evaluating the security of a given system is, in general, a very difficult one. There are people who can evaluate the security of systems and computer tools to assist them, but the knowledge that these people have is very specialized.

Most often, human analysts simply use subjective analysis to evaluate systems: their intuition and their acquired knowledge (from either personal knowledge or asking others) of known security holes, common mistakes, and exploitable avenues of attack. For example, a cryptanalyst trying to find a weakness in a computer hard-drive encryption product would examine the product looking for weaknesses. He would read the technical data about the product, talk to the engineers who designed and coded the product (if possible), or reverse-engineer the software to figure out how it worked. Then he would look for weaknesses. He would, for example, check if the password was stored in an insecure portion of the software or if a copy of the unencrypted files was left on the hard drive. If he had experience in this type of thing, he would know what to look for: certain mistakes tend to be made over and over again by different engineers and programmers. One problem with this type of analysis is that it tends to be non-comprehensive; each expert is only experienced in certain aspects of security analysis and can not easily take advantage of another expert's experience in other aspects.

The analysis also tends to be non-systematic. That is, while many papers are published outlining security holes on cryptographic algorithms, computer network systems, and even physical security systems, rarely are such papers developed into formal tools. Even where such papers are actually developed into formal tools, none discusses a systematic methodology for evaluating security systems, requirements, or attacks. For example, one category of formal tools for security analysis includes software programs that automatically check the security and correctness of formal cryptographic protocols (e.g., BAN logic, GMY logic, and the NRL Protocol Analyzer). The basic idea behind all of these computer programs is that the analyst represents a cryptographic protocol as a series of formal-logic statements, and then uses the computer to make conclusions about the security or insecurity of the protocol. An introduction to this topic can be found in Bruce Schneier, *Applied Cryptography*, $2^{nd}$ Edition (John Wiley & Sons, 1996), pp. 65 to 68. Such crypto-checking programs look at the formal cryptographic protocol as it is envisioned by the cryptographer, i.e., the cryptographic protocols in their ideal mathematical state. In contrast, the present invention's attack trees look at the entire system, as it is installed and used.

Another category of formal tools for security analysis includes risk analysis software, which has been used in information security for over twenty years to isolate areas of risk within an organization and to suggest countermeasures. Risk analysis tools are generally either quantitative (i.e., their results are presented in monetary units) or qualitative (i.e., their results are presented in linguistic terms), and are described in detail in:

Ken Wong and Steve Watt, *Managing Information Security*, Elsevier Science Publishers, 1990, Chapter 5.

K. M. Jackson and J. Hruska, *Computer Security Reference Book*, Butterworth-Heiman, 1992, Chapter 21.

Philip Fites and Martin Katz, *Information Systems Security*, Van Nostrand Reinhold, 1993, Chapter 3.

Zella Ruthberg and Harold Tipton, *Handbook of information Security Management*, Auerbach Publishers, 1993, Chapter 1-3-1.

Zella Ruthberg and Harold Tipton, *Handbook of information Security Management*, 1994–95 Yearbook, Auerbach, 1994, Chapter 1–3.

Quantitative risk analysis methods are often based on a U.S. Government document, FIPS 65. FIPS 65 recommends that a team of analysts produce a list of assets and threats, and assign cost values to the assets and determine frequency of occurrence of the threats. The costs and frequencies are then plugged into formula that is used to evaluate the effect of countermeasures on individual assets. IBM Corporation uses a generally similar method, but with some differences in the identification of the potential effects of exposures. RISKCALC (a software package from Hoffman Business Associates Inc. of Bethesda, Md.), BDSS (from Pickard, Lowe and Garrick Inc. of Newport Beach, Calif.), RISKWATCH and IST/RAMP are also similar. All the above approaches require estimating both cost and frequency assessment, and then using the estimates in connection with a single, rigid formula to come up with an "annual loss expectancy" ("ALE") for each asset. A cost-benefit analysis is then used to determine the effect of various countermeasures on particular assets in terms of their effect in reducing the ALE for a particular asset. One disadvantage of this approach is that it requires both cost and frequency estimates, while in many cases one or both of these measures may not be appropriate (e.g., some things can't be priced) or other measures may more appropriate (e.g., a simple binary measure such as impossible v. possible or a probabilistic measure of occurrence). Thus, the quantitative risk analysis methodologies, while highly formal, are highly inflexible.

Qualitative risk analysis methods try to represent values of data and assets in relation to the potential effects of threats in other than financial terms. Available software packages include LAVA, RISKPAC, MARION, CRAMM, and the Buddy System. The differences in the products are primarily in how they collect data and what form their results appear. The qualitative methods' lack of quantitative capabilities (e.g., cost-benefit analysis) makes comparison of different countermeasures difficult. Furthermore, although they are much more flexible than the quantitative methods, the qualitative methods suffer from a lack of formalism. For example, qualitative methods' lack of structure make them ill-suited for analyzing distributed systems and systems whose overall analysis can be represented by modularized analyses of its component subsystems (weaknesses shared, to some extent, by quantitative risk analysis methods). Finally, risk analysis methods often concentrate on the broad risk faced by large system, at the expense of consideration of the individual attacks that are aggregated to build up to the larger picture.

In summary, the existing risk analysis tools tend to be either formal but excessively rigid, or flexible but lacking the formalism necessary for rigorous system analysis. What is needed is a security analysis tool that provides a strict formalism which nevertheless accomodates great flexibility in the characterization and modelling of systems.

SUMMARY OF THE INVENTION

The present invention provides a method and apparatus for the creation of a database tool to rigorously analyze the security of a system in a formal yet flexible manner. Once created, the structure is provided with details of the information system, and uses the inputted parameters to evaluate the overall security of the system.

The database uses a tree-based structure (an attack tree) to analyze the security of a system. In one embodiment of the invention, the attack tree's root node is the goal of an attacker, the leaf nodes are attacks against that goal, and the intermediate nodes are various combinations of attacks necessary to achieve the goal. Nodes can also include countermeasures the system uses to prevent those attacks, as well as numerical information on how expensive it is to defeat the countermeasures or mount the attack. Numerical values for the root node and intermediate nodes are calculated from the numerical values of their respective child nodes.

The attack tree's root node value gives a quantitative measure of the security of a system in time, dollars, probability of success, or any other metric, as a function of measurements or assumptions about the attacker's resources, abilities, lawlessness, determination, etc. Furthermore, the leaf nodes of the attack tree directly illustrate the assumptions on which the security of the system is based.

Applying attack trees to two related systems allows an analyst to compare the two systems, e.g., to show how a specific change to a system affects the overall security of the system, to determine which of several changes to a security system will most increase the overall security of the system, to show the effects of a new attack on the security of a system, to show the effects of that development on the security of the system, or to show the effects of different business decisions on security.

Finally, multiple analysts can work on different parts of a large attack tree simultaneously. There is no reason for someone to be an expert in all attacks. An analyst can work on one part of the tree even if he has no expertise in other parts of the tree. It is also possible to hide details of part of an attack tree from someone working on another part. This can aid in compartmentalization of security. For example, someone working on an electronic-mail attack tree does not need to know details of the sophisticated cryptanalysis needed to break the public-key algorithm used; he only needs to know the results of the attack tree against the public-key algorithm attack tree so that he can plug them into the electronic-mail attack tree. More generally, a system can be considered an aggregate of smaller subsystems, with the attack trees for the subsystems being plugged into the attack tree for the overall system. This capability greatly facilitates the consideration and analysis of alternative security subsystems.

Indeed, entire branches of an attack tree can be developed even though a particular attack is not yet possible. For example, a branch of an attack tree might require that modified backup tapes be substituted for legitimate ones. Even though it may not be possible to execute that substitution, the attack tree may still be developed. Then, if it suddenly becomes possible to substitute backup tapes, the attack tree has already been developed.

Construction and use of this invention's attack tree will enable the following and other objects of the invention, as will become apparent from the drawings and detailed description of the invention in the sections following:

It is an object of this invention to evaluate the security of a system.

It is an object of this invention to determine the vulnerability of a system against attack.

It is an object of this invention to determine the cost, either in time or money or both, of an attack against a system.

It is an object of this invention to provide a list of security assumptions of a system.

It is an object of this invention to compare the security of two competing systems.

It is an object of this invention to determine the impact of a new attack or countermeasure, changed security subsystem, different business decision, or any other modification to the security of a system.

It is an object of this invention to determine the security of a system based on the security of all of its subsystems.

It is an object of this invention to determine the avenue of attack against a system that is most likely to succeed.

It is an object of this invention to analyze attacks against a system based on probability of success.

It is an object of this invention to determine the best allocation of a security budget.

DETAILED DESCRIPTION OF THE INVENTION

Figure 1:
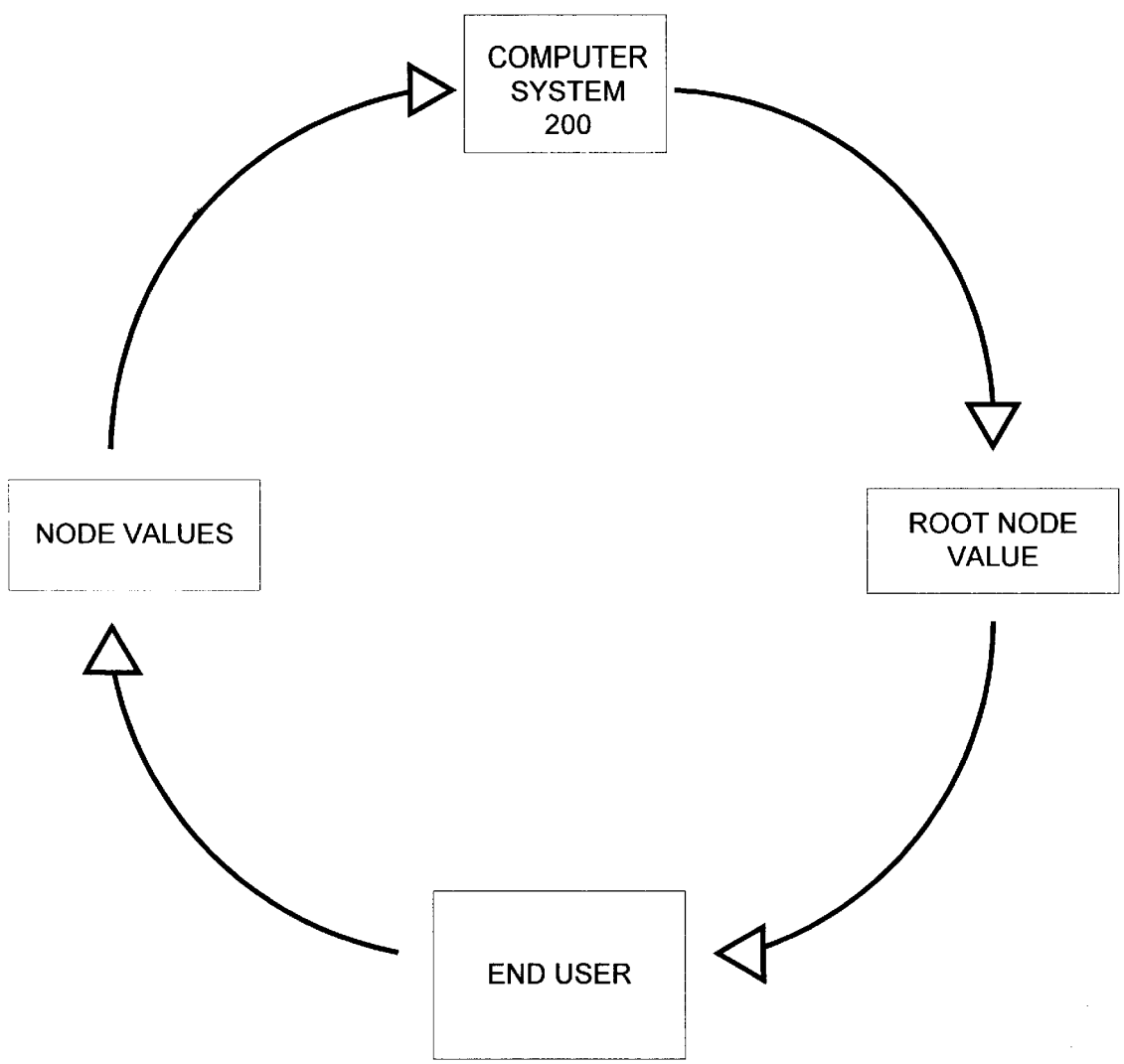
FIG. 1 is illustrates a user's overall interaction with the invention.

FIG. 1 illustrates the overall operation of the invention, which is implemented in a computer system 200 that stores a database tree structure and accepts input from the user in the form of leaf node values. Processing software and hardware within computer system 200 then calculate the tree's intermediate nodes and resultant root node value. Thus, the invention transforms information process parameters (leaf node values) into an overall representation of the security of the system.

In these contexts, "system" is defined as any system that uses security to protect something from a specific attack. Examples include, but are not limited to:

A software program that uses cryptography to protect confidentiality or to authenticate data.

A encrypted telephone that allows two parties to make a confidential phone call.

A physical safe.

A system of writing payroll checks.

A burglar alarm system that protects the contents of a house.

A house.

An entire corporate security system: a combination of computer security, physical security, personnel security, and other security measures.

A inter-bank funds-transfer system.

Note that the system does not have to be specifically designed with security in mind. It could be any system that could possibly be used to protect anything. Examples include, but are not limited to:

A telephone network.

A local-area computer network.

A corporate intranet.

A paper filing system.

The 911 police telephone system.

Furthermore, the system need not be a physical device or structure, but could also be a business process. Examples include, but are not limited to:

Processing accounts payable.

Updating customer databases.

Routing mail throughout offices.

Distributing payroll.

Creating and distributing sales literature.

Note that the problem of evaluating the safety or reliability of a system is really the same as evaluating security. The difference is that while a security evaluation pertains to intelligent attacker trying to break the security of a system, a safety or reliability evaluation assumes an unintelligent attacker (e.g., accidents or failures, respectively) tending to randomly break some functionality of a system. In essence, the safety or reliability of a system is the security of a system with entropy as the attacker. The mechanism of analysis can be exactly the same. Attackers can, of course, exploit weaknesses in safety or reliability. For example, there might be a way to steal money from a bank that only works in event of an accidental fire. Therefore, as used throughout the specification and claims, the term security shall be used to include safety and reliability considerations as well.

A. System Architecture

The system architecture of an exemplary embodiment of the apparatus and method of the present invention is illustrated with reference to FIG. 2. Computer system 200 includes a central processor (CPU) 205, RAM 215, ROM 220, clock 235, operating system 240, and data storage device 260. A conventional personal computer or computer workstation with sufficient memory and processing capability may be used as computer system 200. A Pentium microprocessor such as the 100 MHz P54C, commonly manufactured by Intel Company, may be used for CPU 205. Equivalent processors include the Motorola 120 MHz PowerPC 604, Sun Microsystem's 166 MHz UltraSPARC-I, or any other processor capable of performing the computational processes described herein.

Data storage device 260 may include hard disk magnetic or optical storage units, CD-ROM drives, flash memory, or any other computer-readable medium from which information can be stored and accessed. More specifically, data storage device 260 contains databases and software programs used in the processing of transactions in the present invention, including:

User interface program 265, which presents information to, and receives input from, the user.

Tree structure data storage database 270, which maintains newly created or previously stored attack tree structures for particular systems.

Tree analysis database 290, which maintains programs for creating and analyzing the attack tree structures. (There are three different software programs: one for Boolean variables 292, one for continuous-valued variables 294, and one for special operations 296.) While the above embodiment describes a single computer acting as computer system 200, those skilled in the art will realize that the necessary functionality can be distributed over a plurality of computers. In one such embodiment, computer system 200 is configured in a distributed architecture, wherein the system processors and databases are housed in separate units or locations. Those skilled in the art will appreciate that an almost unlimited number of locations may be supported. Locations performing primary processing functions contain at least RAM, ROM, and a general purpose processor. Other locations need only contain sufficient storage to act as software or data servers, plus the associated processing capacity for serving the information. Each location is attached to a WAN hub having minimal processing capability and serving primarily as a communications router. This arrangement can yield a dynamic and flexible system that is less prone to catastrophic hardware failures affecting the entire system.

B. Attack Tree Structure

Tree structures are a type of data structure generally having: a first level including a plurality of leaf nodes; at least one intermediate level including a plurality of intermediate nodes (called interior nodes), each of which is derived by a predetermined mathematical operation on one or more nodes in a lower level; and a top level (or root) node derived by a predetermined mathematical operation on one or more intermediate nodes. Thus, the intermediate and root nodes can also be characterized as logic nodes. It is common to speak of a higher level (closer to the root) node having as its children the lower level (farther from the root) nodes from which the higher level node is derived. Thus, leaf nodes are seen to have no children. Conversely, a group of lower level nodes may be said to have as their parent a higher level node derived from the lower level nodes. While the above describes a canonical tree structure, those skilled in the art will appreciate that the term also includes various degenerate cases including, but not limited to, multiple root nodes, no intermediate levels, or cross-level linkages.

An attack tree is a tree structure where the root node is the goal of an attacker, leaf nodes are the attacker's possible actions, and the intermediate nodes represent various combinations of the attacker's actions that may achieve his goal.

Figure 3:
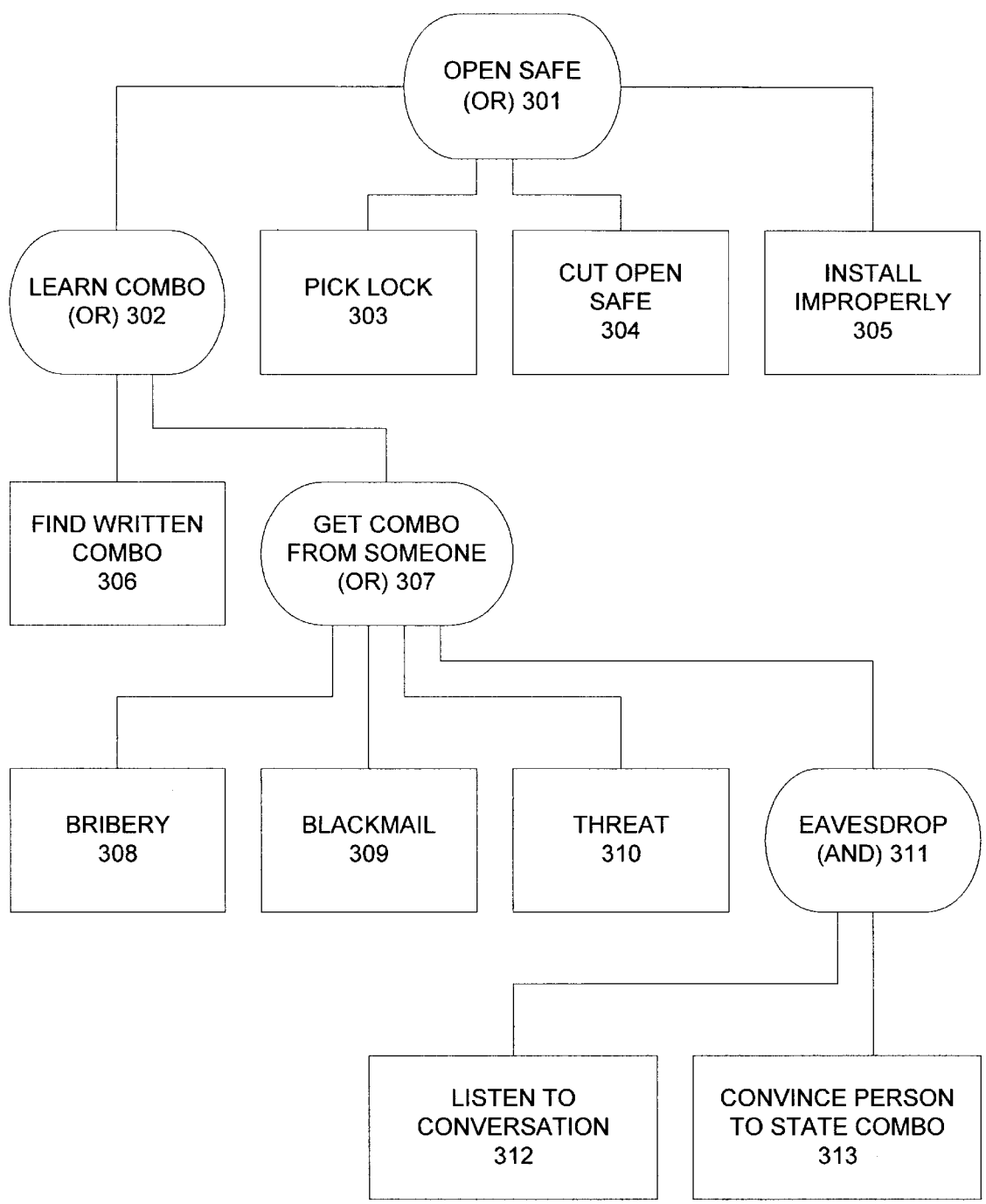
FIG. 3 illustrates an exemplary attack tree structure for breaking into a safe.

FIG. 3 is a sample attack tree. (Note that this attack tree, as well as all others in this patent application, are examples only. They do not necessarily represent accurate attack trees against systems, nor do the values of any of the nodes necessarily represent accurate values.) The goal node 301 is the goal of a hypothetical attacker; in this example, to open a safe. This is an OR node; meaning that in order to complete this goal it is necessary to satisfy the subgoal representing any of the node's children: 302, 303, 304, and 305. Child node 302 is also an OR node and has two child nodes: 306 and 307. Child node 307 is also an OR node and has four child nodes: 308, 309, 310, and 311. Finally, child node 311 has two child nodes: 312 and 313. Child node 311 is an AND node, meaning that in order to satisfy this node, it is necessary to complete the subgoals represented by all of the node's children. The remaining nodes (303, 304, 305, 306, 308, 309, 310, 312, and 313) are leaf nodes representing the attacker's possible actions rather than logical operations on values of other nodes. The attack tree of FIG. 3 can also be described in outline format as shown below:

G1: Open a safe (OR) 301
G1.1 Learn the combination of the safe (OR) 302
G1.1.1. Find the combination written down 306
G1.1.2. Get the combination from someone who knows (OR) 307
G1.1.2.1. Bribe someone who knows the combination 308
G1.1.2.2. Blackmail someone who knows the combination 309
G1.1.2.3. Threaten someone who knows the combination 310
G1.1.2.4. Eavesdrop on conversation where someone states the combination (AND) 311
G1.1.2.4.1. Listen to the conversation 312
G1.1.2.4.2. Convince someone to state the combination 313
G1.2. Pick the lock of the safe 303
G1.3. Cut open the safe 304
G1.4. Convince the safe installer to install it improperly 305

The goal node, also called G1, corresponds to 301 in FIG. 3. Node G1.1 corresponds to 302, G1.2 corresponds to 303, G1.3 corresponds to 304, and G1.4 corresponds to 305. Node G1.1.1 corresponds to 306, G1.1.2 corresponds to 307, G1.1.2.1 corresponds to 308, G1.1.2.2 corresponds to 309, G1.1.2.3 corresponds to 310, and G1.1.2.4 corresponds to 311. G1.1.2.4.1 corresponds to 312 and G1.1.2.4.2 corresponds to 313. The leaf nodes are G1.2, G1.3, G1.4, G1.1.1, G1.1.2.1, G1.1.2.2, G1.1.2.3, G1.1.2.4.1, and G1.1.2.4.2. This outline representation makes it easy to determine which nodes are the parents and children of other nodes, simply by looking at the node number. Hence, each node on an attack tree has a unique identification number. An attack tree can also be referred to by the identity of the goal node. The above sample attack tree can be called G1.

C. Node Values

1. Possible/Impossible Node Value Embodiment

In the above attack tree structure, each goal and interior node performs either an AND or an OR operation on its respective child or leaf nodes. Consistent with these operations, in one embodiment of the present invention, leaf nodes take on the values of possible or impossible.

Figure 4:
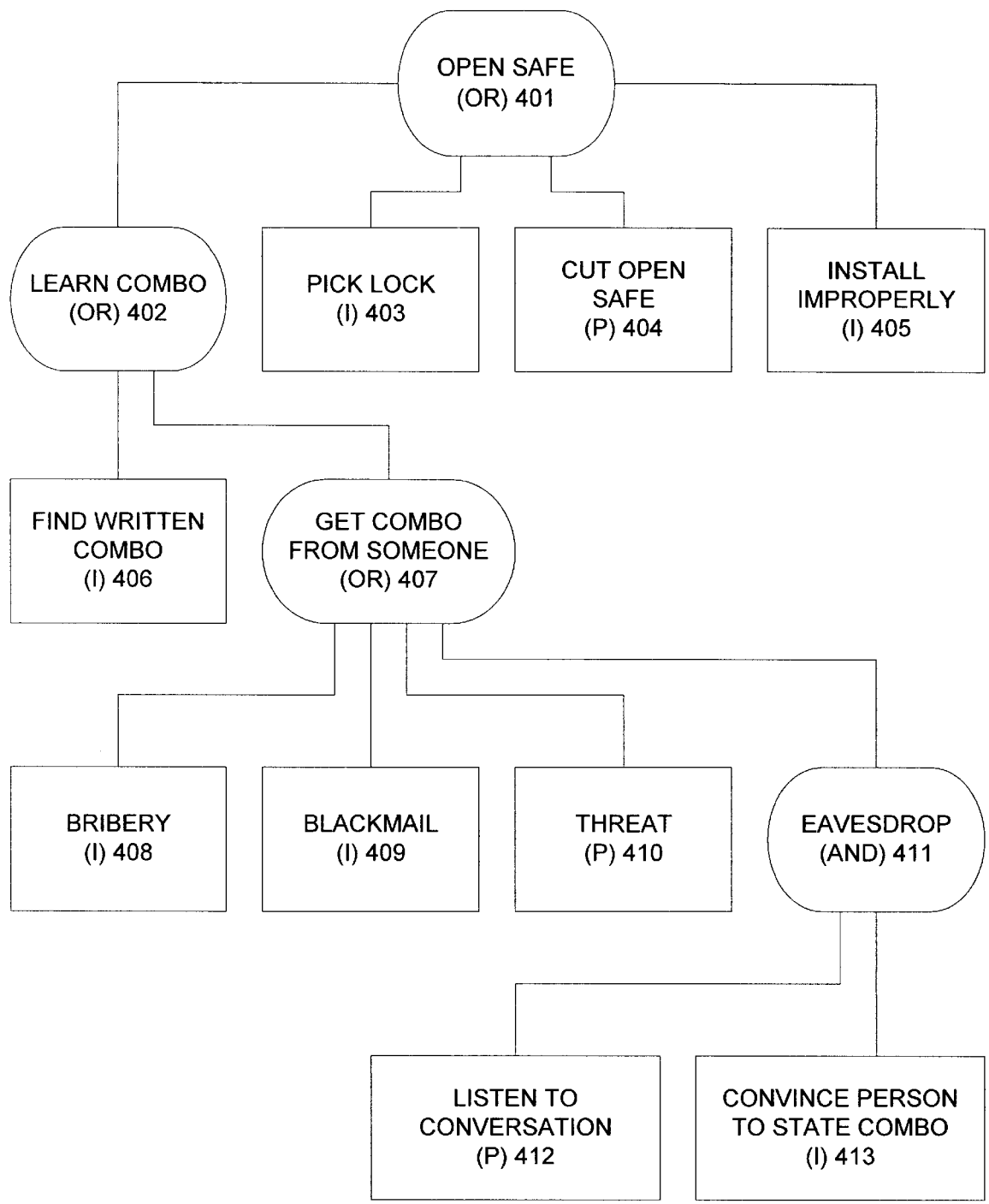
FIG. 4 illustrates inputted Boolean leaf node values for FIG. 3.

FIG. 4 shows the attack tree of FIG. 3 whose leaf nodes have been marked as either possible [P] or impossible [I]. The markings, [P] or [I], indicate whether it is possible for an attacker (whose resources, time, ability, etc. are known) to achieve the action. These markings are determined by the actual characteristics of a real system in a specific operational environment. The attack tree's specific leaf node values in FIG. 4 can also be described in outline form below:

G2: Open a safe (OR)
G2.1. Learn the combination of the safe (OR) 402
G2. 1.1. Find the combination written down [I] 406
G2.1.2. Get the combination from someone who knows (OR) 407
G2.1.2.1. Bribe someone who knows the combination [] 408
G2.1.2.2. Blackmail someone who knows the combination [I] 409
G2.1.2.3. Threaten someone who knows the combination [P] 410
G2.1.2.4. Eavesdrop on a conversation where someone states the combination (AND) 411
G2.1.2.4.1. Listen to the conversation [P] 412
G2.1.2.4.2. Convince someone to state the combination [I] 413
G2.2. Pick the lock of the safe [I] 403
G2.3. Cut open the safe [P] 404
G2.4. Convince the safe installer to install it improperly [I] 405

2. Other Boolean Node Value Embodiments

In the above sample attack tree, possible and impossible were two choices for node values. In general, any Boolean attribute can be assigned to nodes. A Boolean attribute is an attribute that can take one of two values. Examples of Boolean attributes are:

easy and not easy
expensive and not expensive
intrusive and non-intrusive
legal and illegal
can be done without special equipment and requires special equipment The following attack tree is the same as G1, with the leaf nodes assigned values of [NSE]=Can be done without special equipment and [SE]=Requires special equipment:

G3: Open a safe (OR)
G3.1. Learn the combination of the safe (OR)
G3.1.1. Find the combination written down [NSE]
G3.1.2. Get the combination from someone who knows (OR)
G3.1.2.1. Bribe someone who knows the combination [NSE]
G3.1.2.2. Blackmail someone who knows the combination [NSE]
G3.1.2.3. Threaten someone who knows the combination [NSE]
G3.1.2.4. Eavesdrop on a conversation where someone states the combination (AND)
G3.1.2.4.1. Listen to the conversation [SE]
G3.1.2.4.2. Convince someone to state the combination [NSE]
G3.2. Pick the lock of the safe [SE]
G3.3. Cut open the safe [SE]
G3.4. Convince the safe installer to install it improperly [NSE]

3. Continuous Node Value Embodiment

The feasibility of most attacks is not black and white: in general, it is not reasonable to define attacks as either possible or impossible. It is sometimes better to define attacks in terms of their cost, time, resources, etc. Thus, in another embodiment of the present invention, leaf nodes take on continuous numerical values. Of course, although continuous values are possible, they need not be allowed. For example, when estimating costs, it may be unrealistic to require precision to increments smaller than one hundred dollars. To facilitate the input of such estimates, the user interface (described later) may only present the user with quantized values in a selection menu (e.g., $1000, $3000, $10,000, $30,000, $100,000, etc.). However, the nodes are still considered to be continuous-valued even though their inputted values may be quantized. Examples of continuous numerical values are:

Cost in dollars to attack/defend
Time to achieve/repulse
Cost in resources to attack/defend Attack tree G4 illustrates the same attack tree structure as G1, G2, and G3, but with costs to attack defined for each leaf node:

G4: Open a safe (OR)
G4. 1. Learn the combination of the safe (OR)
G4. 1.1. Find the combination written down [$75K]
G4.1.2. Get the combination from someone who knows (OR)
G4.1.2.1. Bribe someone who knows the combination [$60K]
G4.1.2.2. Blackmail someone who knows the combination [$100K]
G4.1.2.3. Threaten someone who knows the combination [$20K]
G4.1.2.4. Eavesdrop on a conversation where someone states the combination (AND)
G4.1.2.4. 1. Listen to the conversation [$20K]
G4.1.2.4.2. Convince someone to speak the combination [$40K]
G4.2. Pick the lock of the safe [$30K]
G4.3. Cut open the safe [$10K]
G4.4. Convince the safe installer to install it improperly [$100K]

4. Probability Node Value Embodiment

Alternatively, nodes can have values associated with probabilities. For example, suppose that the parameter is the probability that an attacker will perform (or chose or know of) a specific attack.

Attack tree G4' illustrates the same attack tree, but with the probability of attack defined for each leaf node:

G4': Open a safe (OR)
G4'.1. Learn the combination of the safe (OR)
G4'.1.1. Find the combination written down [30%]
G4'.1.2. Get the combination from someone who knows (OR)
G4'. 1.2.1. Bribe someone who knows the combination [25%]
G4'.1.2.2. Blackmail someone who knows the combination [15%]
G4'.1.2.3. Threaten someone who knows the combination [15%]
G4'. 1.2.4. Eavesdrop on a conversation where someone states the combination (AND)
G4'.1.2.4.1. Listen to the conversation [60%]
G4'. 1.2.4.2. Convince someone to speak the combination [20%]
G4'.2. Pick the lock of the safe [70%]
G4'.3. Cut open the safe [80%]
G4'.4. Convince the safe installer to install it improperly [15%]

In the above sample attack tree, the sum of the probabilities of a given OR node's children do not necessarily equal 100%. This is because the probabilities defined in attack tree G4' illustrate the probability that a given attack is successfull, and not the probability that a given attacker will attempt a specific attack (as opposed to another attack). Attack tree G4" illustrates the same attack tree, with the probabilities defined as the probability that a given attacker will attempt the attack described in each child of an OR node. Note that some nodes with probabilities defined are not leaf nodes. Also note that probabilities are not given for the children of AND nodes, since an attacker must attempt all children in order to satisfy the parent node.

G4": Open a safe (OR)
G4".1. Learn the combination of the safe [25%] (OR)
G4". 1. 1. Find the combination written down [40%]
G4". 1.2. Get the combination from someone who knows [60%] (OR)
G4". 1.2. 1. Bribe someone who knows the combination [25%]
G4".1.2.2. Blackmail someone who knows the combination [15%]
G4".1.2.3. Threaten someone who knows the combination [10%]
G4".1.2.4. Eavesdrop on a conversation where someone states the combination [50%] (AND)
G4". 1.2.4.1. Listen to the conversation
G4". 1.2.4.2. Convince someone to speak the combination
G4".2. Pick the lock of the safe [30%]
G4".3. Cut open the safe [30%]
G4".4. Convince the safe installer to install it improperly [15%]

As was said above, the sum of the probabilities of a given OR node's children (in attack tree G4") necessarily equal 100%. For example, the probability of G"4.1 is 25%, the probability of G"4.2 and G"4.3 is 30% each, and the probability of G"4.4 is 15%. These four probabilities sum to 100%.

5. Embodiment with Unknown Leaf Nodes

Since it is not reasonable to assume that an attack tree contains every possible attack, it is often beneficial to include nodes for unknown attacks. Attack tree G5 is a sample attack tree with nodes representing unknown attacks:

G5: Open a safe (OR)
G5. 1. Learn the combination of the safe (OR)
G5. 1.1. Find the combination written down
G5.1.2. Get the combination from someone who knows (OR)
G5.1.2.1. Bribe someone who knows the combination
G5.1.2.2. Blackmail someone who knows the combination
G5.1.2.3. Threaten someone who knows the combination
G5.1.2.4. Eavesdrop on a conversation where someone states the combination (AND)
G5.1.2.4.1. Listen to the conversation
G5.1.2.4.2. Convince someone to state the combination
G5.1.2.5. Unknown attack
G5.1.3. Unknown attack
G5.2. Pick the lock of the safe
G5.3. Cut open the safe
G5.4. Convince the safe installer to install it improperly
G5.5. Unknown attack Note that unknown nodes are children only of OR nodes, because it makes no sense to have unknown attack nodes as children of AND nodes.

Thus, attack tree structures can be defined to reflect known and/or unknown attacks, each 10 of which has a Boolean or continuous value that is either input by the user (of a leaf node) or calculated (for a child or root node). In the case of the unknown attack nodes, estimates for the values can be entered based on how much time the analyst has spent thinking of all attacks, and how much assurance he has that there are no unknown attacks that he hasn't thought of yet. For example, if the analyst has only spent a short time thinking about attacks against the system, the cost of unknown attacks should be estimated as low. However, if the analyst has spent considerable time thinking about attacks against the system, and is reasonably sure that he has not left out any possible attacks, then the cost of unknown attacks should be estimated as high. Similarly, if the analyst has only spent a short time thinking about attacks against the system, the probability of unknown attacks should be estimated as high; if the analyst has spent considerable time thinking about attacks against the system, and is reasonably sure that he has not left out any possible attacks, then the probability of unknown attacks should be estimated as low.

C. Tree Construction and Analysis

Figure 5:
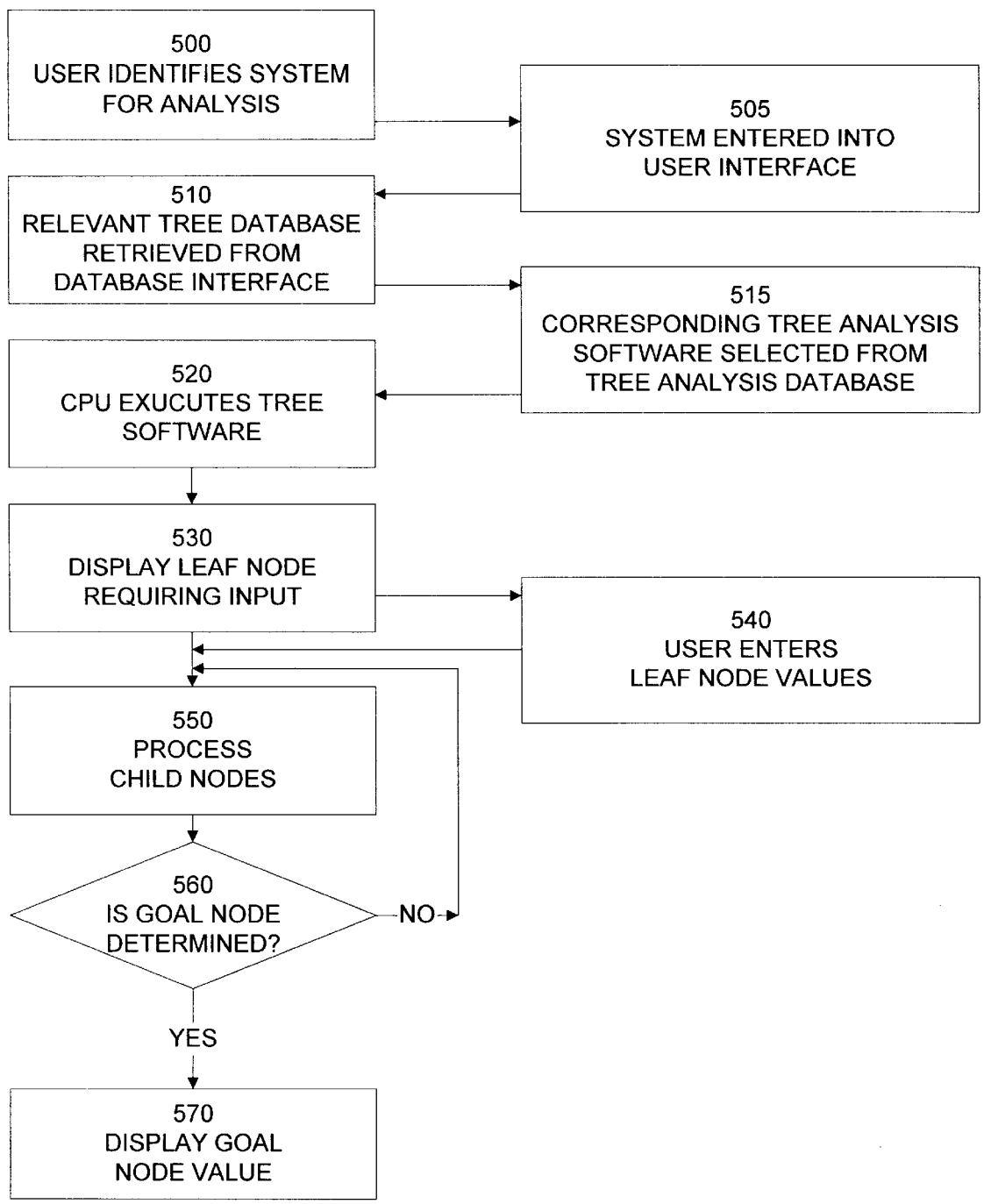
FIG. 5 is a flow chart illustrating attack tree creation and overall security evaluation.

Having established the tree structure and inputted the appropriate leaf values and logical formulas for an operational environment, execution of the logical operations results in values being calculated for the intermediate and root nodes. The value of the root node then represents the attackability of the system for that operational environment. FIG. 5 illustrates this process. Systems may include any process used in a business or organization which is subject to attack. Obvious examples include the delivery of cash or other valuables, transmission of sensitive corporate R&D data, or the storage of customer databases. Less obvious examples might include the delivery of mail to corporate offices, human resource processing protocols or accounts payable operations.

The user identifies the system to be analyzed at step 500 and enters it into user interface 265 using input device 245 at step 505. In one embodiment of the invention, user interface 265 is a multiple-choice (e.g., menu) driven interface allowing the user to define the number of levels, and number of nodes at each level; the attributes and data types of the leaf nodes at the lowest level; and the functional interrelationships between each parent node and its underlying child nodes (using the algebraic, binary and other logical constructs described previously). The attack tree structure thus defined is then stored in tree structure database 270 for future use. If such a structure has previously been defined (or an existing structure is to be modified for the present analysis), then at step 510, the relevant attack tree database is retrieved from tree structure database 270. At step 515, the attack-tree analysis software corresponding to the selected tree structure is retrieved from the tree analysis database 290. This software, which performs the logical operations on the child and root nodes (as will be described below with respect to FIG. 6), can either be for analyzing Boolean node values 292 or for continuous node values 294. At step 520, CPU 205 executes tree analysis software 292 or 294, beginning the node input process.

At step 530, leaf nodes requiring values are displayed on video monitor 230 by user interface 265. At step 540, the user enters all leaf node values into user interface 265. To determine the value of each leaf node, the user may research the system being analyzed, interview people responsible for the process, or review security reports pertaining to the system. For example, in the sample attack tree of FIG. 4, leaf node 406 ("Find the combination written down") has a status of either possible or impossible. The user may consult the procedure manual for handling safe transactions, and assign a value of impossible if the manual indicates that personnel are not to write the combination down anywhere. Alternatively, interviews may reveal that some personnel are ignoring policy by routinely writing down the combination and leaving it in their desks, in which case the leaf node value is set to possible. The user similarly assigns a value of possible or impossible to each remaining leaf node. When the user is finished, the tree might look like the sample attack tree shown in FIG. 4. In alternate embodiments, where the leaf nodes have other Boolean or continuous values, the user will enter appropriate node values into user interface 265.

Once the leaf node values have been entered at step 540, tree analysis software 292 or 294 retrieves the parent node of the most distant remaining child node (initially, the leaf node furthest from the goal node) at step 550. In the sample attack tree of FIG. 4, this would be node 411 ("Eavesdrop on a conversation where someone states the combination"). The tree analysis software determines the value of that node in accordance with the processes described below with respect to FIGS. 6 or 7. The process continues at step 560, where the tree analysis software determines if the goal node has been calculated. If not, the process returns to step 550 and retrieves another child node for processing. If so, at step 570, the calculated value of the goal node is displayed on video display 230 of computer system 200.

1. Boolean Value Nodes

Figure 6:
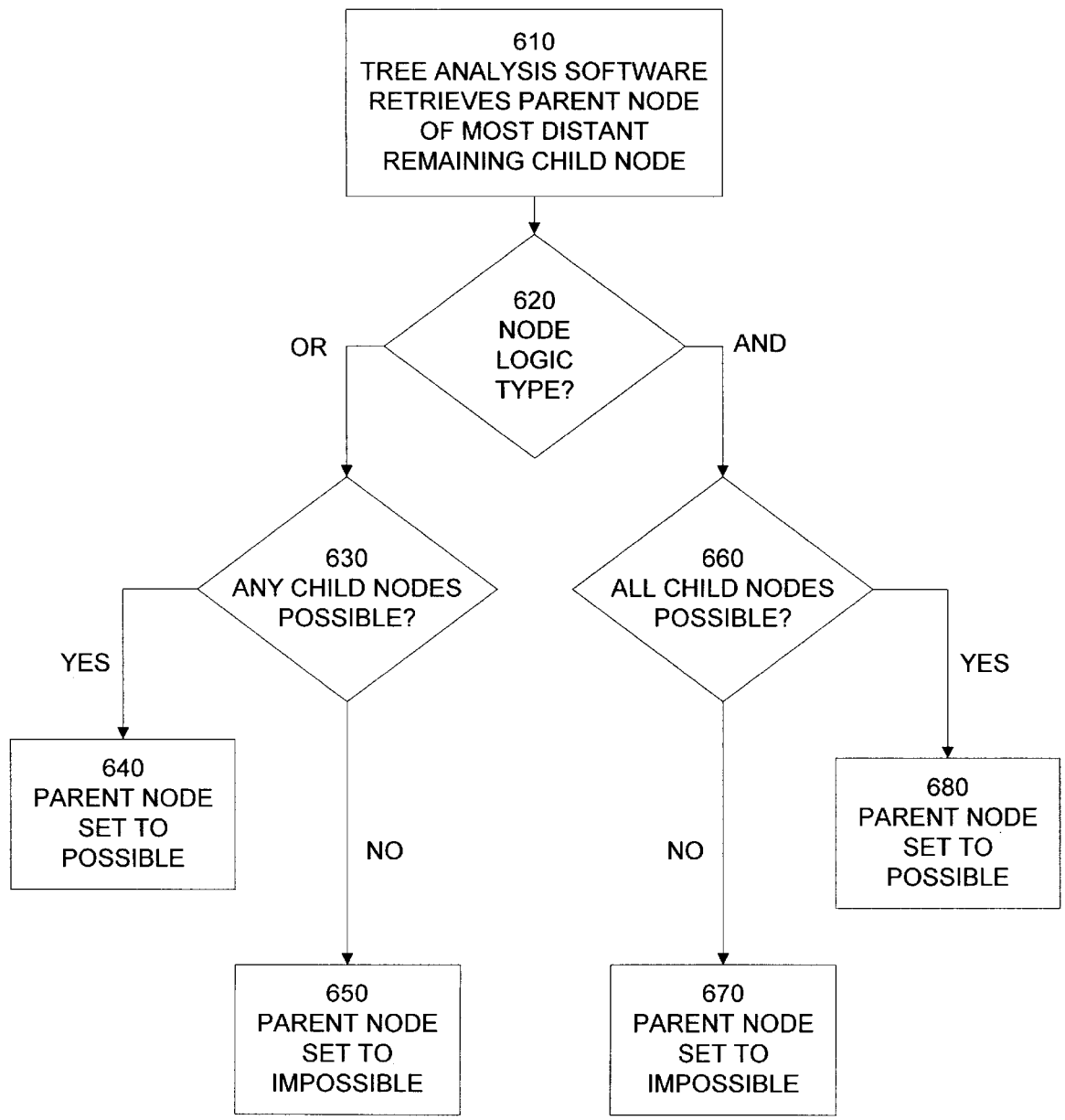
FIG. 6 is a flow chart illustrating evaluation of Boolean node values.

Referring now to FIG. 6, there is described in detail the process encapsulated in step 550 by which Boolean node values are calculated and assigned. At step 610, the tree analysis software retrieves the parent node of the most distant leaf node. At step 620, the tree analysis software retrieves the logic of the node, i.e., whether it is an AND node or an OR node. If it is an AND node, the process continues with step 660. At step 660, the tree analysis software checks to see whether all of the child nodes of the node have positive (e.g., possible) values or negative (e.g., impossible) values. If all of the child nodes have positive values, then the parent node is set to positive at step 680. If at least one of the child nodes has a negative value, then the parent node is set to negative at step 670.

If the node identified at step 620 is an OR node, the process continues with step 630. At step 630, the tree analysis software checks to see whether all of the child nodes of the node have positive (e.g., possible) or negative (e.g., impossible) values. If any of the child nodes has a positive value, then the parent node is set to positive at step 640. If all of the child nodes have a negative value, then the parent node is set to negative at step 650. As described previously, the process then returns to step 560 and, if any child node remains, the process of step 550 (FIG. 6) is repeated until the goal node is determined.

The following is an example of the process described in FIG. 6 used on the sample attack tree of FIG. 4 (attack tree G2). At step 610, the tree analysis software 292 determines that node 411 is to be processed first. At step 620, the tree analysis software retrieves the logic of node 411 ("Eavesdrop on a conversation where someone states the combination") as an "AND" node. At step 660, the tree analysis software checks to see whether all of the child nodes of node 411 (nodes 412 and 413) have values of possible. Since node 413 is impossible, parent node 411 is set to impossible. Once the value of the parent node has been set, the tree analysis software 292 returns to step 610 at which point the next most distant remaining parent node is selected. In this example, the next parent node would be node 407 ("Get the combination from somebody who knows"). As this is an OR node, the process would continue to step 630 where the tree analysis software 205 checks to see whether any child nodes have values of possible. Since node 407 has a child node that is possible (node 410) the value of node 407 is set to possible.

The next parent node to be computed is node 402 ("Learn the combination of the safe"), an OR node. Because node 407 is possible, node 402 is also set to possible at step 640. Once all parent nodes have been calculated, analysis begins on the goal node 401. Since it is an OR node, the tree analysis software proceeds to step 630 and checks to see if any child nodes are possible. As node 402 is possible, goal node 401 is set to possible at step 640. All nodes of the attack tree have now been calculated. Those skilled in the art will understand that there are many options available as to the order in which the parent nodes are calculated in the above embodiment. In some embodiments, not all nodes need to be calculated.

The outline below shows the sample attack tree of FIG. 4, with the values of possible and impossible filled in for all of the interior nodes and the goal node, in accordance with the example described above:

G6: Open a safe [P] (OR)
G6.1. Learn the combination of the safe [P] (OR)
G6. 1.1. Find the combination written down [I]
G6.1.2. Get the combination from someone who knows [P] (OR)
G6.1.2.1. Bribe someone who knows the combination [I]
G6.1.2.2. Blackmail someone who knows the combination [I]
G6.1.2.3. Threaten someone who knows the combination [P]
G6.1.2.4. Eavesdrop on a conversation where someone states the combination [I] (AND)
G6.1.2.4.1. Listen to the conversation [P]
G6.1.2.4.2. Convince someone to state the combination [I]
G6.2. Pick the lock of the safe [I]
G6.3. Cut open the safe [P]
G6.4. Convince the safe installer to install it improperly [I]

The attack tree, with every leaf node marked as possible or impossible, is a systematic and computationally efficient way of representing and manipulating a large Boolean representation of the security of a system. If the attack tree is comprehensive, and we can equate the values possible=true and impossible=false to the leaf nodes, then we can say definitively what the security of the system is against an attack (against the particular goal).

2. Continuous Value Nodes

Figure 7:
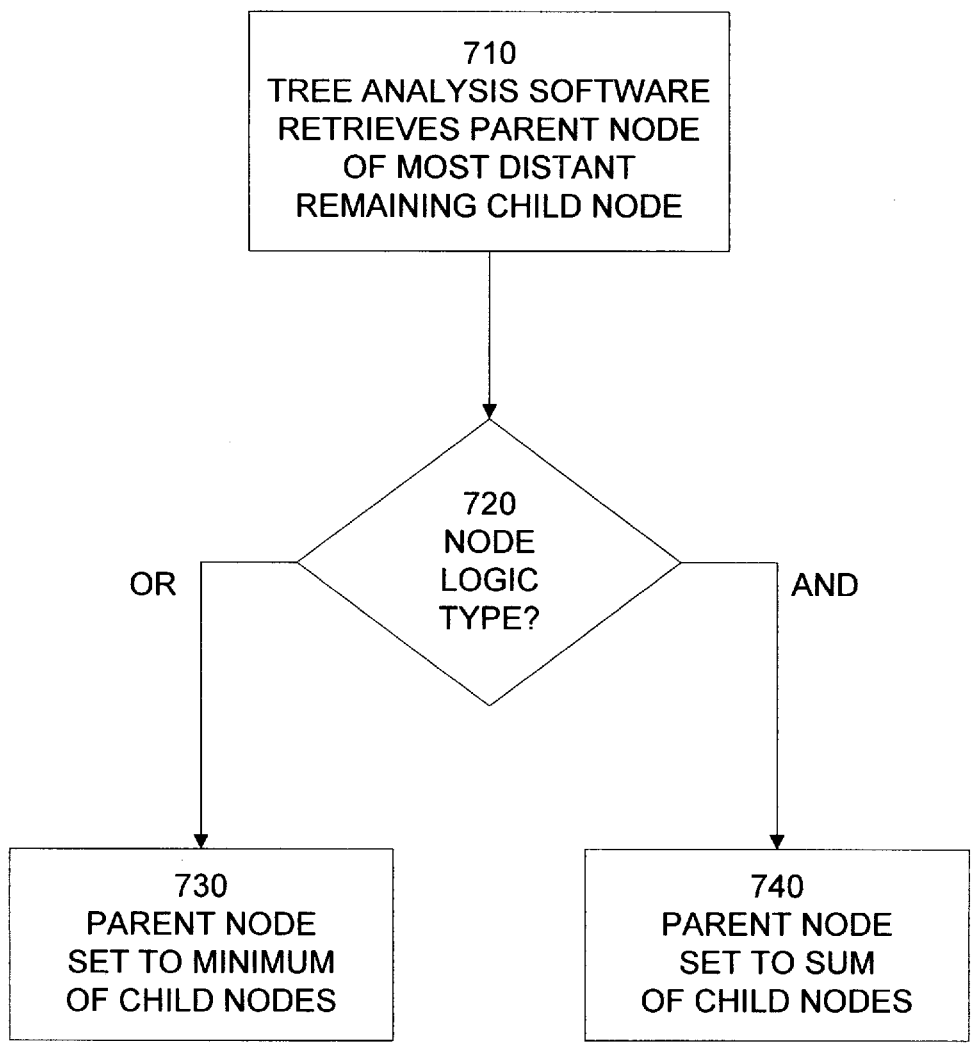
FIG. 7 is a flow chart illustrating evaluation of continuous node values.

Referring now to FIG. 7, there is described the process by which continuous-value nodes are calculated and assigned. At step 710, the tree analysis software retrieves the parent node of the most distant remaining child node. At step 720, the tree analysis software retrieves the logic of a node, i.e., whether it is an AND node or an OR node. If it is an AND node, the process continues with step 740, where the tree analysis software retrieves values of all the child nodes and sets the parent node to the sum of those values. If the node is an OR node, the process continues with step 730, where the tree analysis software retrieves the values of all the child nodes and sets the parent node to the minimum of those values. As described previously, the process then returns to step 560 and, if any child node remains, the process of step 550 (FIG. 7) is repeated until the goal node is determined.

The following is an example of the process described in FIG. 7 used on sample attack tree G4. At step 710, the tree analysis software 294 determines that node G4.1.2.4 is to be processed first. At step 720, the tree analysis software retrieves the logic of node G4. 1.2.4 ("Eavesdrop on a conversation where someone states the combination"), in this case the fact that it is an AND node. At step 740, the tree analysis software retrieves the values of all the child nodes of node G4.1.2.4 (nodes G4.1.2.4.1 and G4.1.2.4.), and the value of node G4.1.2.4 is set to the sum of the values of the child nodes: in this case $60K. Once the value of the parent node has been set, the tree analysis software returns to step 710 at which point the next most distant remaining parent node is selected. In this example, the next parent node would be node G4.1.2 ("Get the combination from somebody who knows"). As this is an OR node, the process would continue to step 730 where the tree analysis software retrieves the value of all the child nodes. At step 730, the value of the parent node is then set to the minimum value of all of the child nodes. Since node G4.1.2 has a child with a cost of $20K (node G4.1.2.3), the value of G4.1.2 is also set to $20K. The tree analysis software then returns, via step 560, to step 710 at which point the next most distant remaining parent node is selected.

The next parent node computed is node G4.1 ("Learn the combination of the safe"), an OR node. The values of its children are the following: G4.1.1 is $75K, and G4.1.2 was calculated above to be $20K. The value of G4.1 is also set to $20K in step 730. Once all parent nodes have been calculated, analysis begins on the goal node G4. Since it is an OR node, tree analysis software 294 proceeds to step 730 and checks the values of the child nodes. Node G4.1 was calculated to have a value of $20K, G4.2 has a value of $30K, G4.3 has a value of $10K, and G4.4 has a value of $100K. Thus, in step 730, the value of G4 is set to $10K. All nodes of the attack tree have now been calculated.

The outline below shows the results as attack tree G7, with the cost values filled in for all of the nodes, in accordance with the example described above.

G7: Open a safe (OR) [$10K]
G7.1. Learn the combination of the safe (OR) [$20K]
G7.1.1. Find the combination written down [$75K]
G7.1.2. Get the combination from someone who knows (OR) [$20K]
G7.1.2.1. Bribe someone who knows the combination [$60K]
G7.1.2.2. Blackmail someone who knows the combination [$100K]
G7.1.2.3. Threaten someone who knows the combination [$20K]
G7.1.2.4. Eavesdrop on a conversation where someone states the combination (AND) [$60K]
G7.1.2.4.1. Listen to the conversation [$20K]
G7.1.2.4.2. Convince someone to state the combination [$40K]
G7.2. Pick the lock of the safe [$30K]
G7.3. Cut open the safe [$10K]
G7.4. Convince the safe installer to install it improperly [$100K]

3. Probabilistic Node Values

In the sample attack tree above, cost was used as the continuous-value parameter of node values. However, it is clear that many other parameters may also be used. In general counting parameters (such as cost, time, etc.) may be used with the above-described AND/OR (including SUM and MIN) logic. However, certain other parameters may require additional or alternative functionality.

A special case of continuous-valued nodes involves probabilistic, rather than counting, values. In that case, the simple AND/OR logic described above must be modified to accommodate the special operations of probability.

Since probabilities are not unbounded, but must range from 0 to 1, the simpler AND/OR logic described above must be expanded to account for the laws of probability. In particular, in an any one operation nominally represented by an OR, the appropriate function would be addition, to reflect the total probability that any of the child events will occur.

Conversely, in an all required operation nominally represented by an AND, the appropriate function would be multiplication, so as to reflect the overall probability of the occurrence of every child node. The foregoing assumes, of course, that the child nodes are independent. If not, the appropriate functionality in a simple 2-child case would be P(A or B)=P(A)+P(B)−P(A and B) and P(A and B)=P(A|B) ×P(B), respectively. Here, P(A) and P(B) represent the probabilities of occurrence of the attributes of child leaves A and B respectively, P(A or B) represents the logic of an at least one parent node, P(A and B) represents the logic of an all required parent node, and P(A|B) represents the conditional probability that A will occur given B. Still other scenarios involving more complicated combinations of child node events (e.g.,>2 child nodes) will require even more sophisticated logical constructs, as will be appreciated by those skilled in the art.

4. Generalized Node Value Embodiment

In general, then, the possible logical functionality of parent nodes will include standard algebraic (+, −, ×, zeroization, etc.), Boolean (AND, OR, NOT, NAND, NOR, XOR, ⊙ (coincidence), etc.), relational (<, >, =, MIN, MAX, etc.) and other more complicated functionality executable on a digital computer including composite functions derived from the basic operations above.

Figure 2:
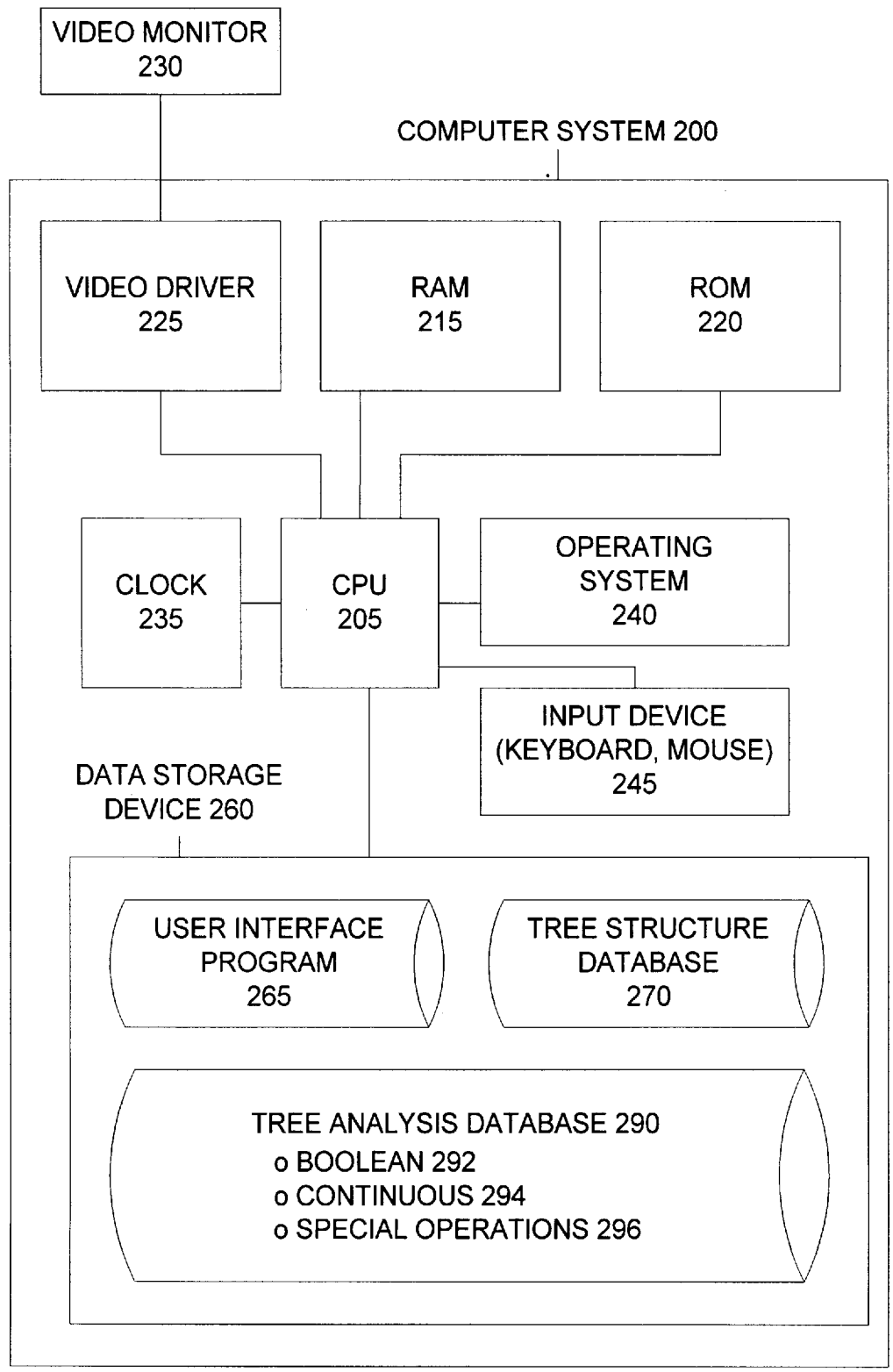
FIG. 2 is a schematic of an exemplary hardware implementation of the invention.

Such operators can be implemented within tree analysis software 292 as a sub-option within Boolean node value 292 or continuous node module 294, or as a separate special operations module 296 (see FIG. 2). Still other binary, algebraic, or special operators needed for other attack models (as described previously) are also provided, as necessary.

The foregoing illustrates the basic forms of attack trees and the operations of tree analysis software 290 in constructing a tree structure, inputting its leaf node values, and calculating the values of logic nodes to ultimately give a measure of the security of the system. The remainder of this specification describes various applications of the attack trees described above.

5. Countermeasures

The above-described attack trees reflect an attacker's perspective (e.g., Is this attack possible? How much will it cost to attack?) but it is clear that the attack trees could alternatively be drawn to reflect the defender's perspective (e.g., Can this attack be defeated? How much will it costs to defend?) using the same Boolean or continuous node values and logic. Which perspective is taken is determined by the user during tree structure creation. For example, from the attacker's perspective, leaf nodes should be defined as attacks, while from the defender's perspective, leaf nodes could be defined as countermeasures (e.g., the feasibility, cost, or probability of attacks against these countermeasures). Examples of countermeasures are shown parenthetically in attack tree G7 below. Of course, consideration of countermeasures is not restricted to only the defender's perspective. Known countermeasures to attacks could also be incorporated indirectly (e.g., "overcome the anti-theft sensor") or indirectly (e.g., "attack a system which happens to be protected by an anti-theft sensor"). Furthermore, countermeasures can be either offensive (e.g., How can an attack be neutralized?) or defensive (e.g., How can a potential failure mode be eliminated?). Finally, countermeasures need not be limited to the leaf nodes, but could also be expressed within logic nodes (e.g., requiring one or more child nodes to achieve/defeat a particular countermeasure). The foregoing shows that there is great flexibility in representing attacks and countermeasures within an attack tree. Other possible constructions include (but are not limited to):

The root node represents the goal, its children represent attacks against that goal, the children of the attacks represent countermeasures against the attacks, the children of the countermeasures represent attacks against the countermeasures, etc.

The root node represents the goal, and all the other nodes represent countermeasures protecting the goal (attacks are incorporated into the countermeasure nodes).

The root node represents the goal, and all other nodes represent attacks against the goal (countermeasures are incorporated into the attack nodes).

6. Another Sample Attack Tree

As another sample attack tree, the following is an attack tree against a low-value payment card system used at a major university; students can buy a smart card which allows them to make small purchases at the cafeteria, university bookstore, post office, etc. A system-wide attack is one in which an attacker is able to get free services for many people, and either sell or give away these free services.

G8: System-wide Attack on the Payment System (OR)

G8.1. Replay Valid Authorizations (OR)

G8.1.1. Replay Whole Valid Transactions (AND)

G8.1.1.1. Get Replay To Work in Real Time (OR)

G8. 1.1.1.1. Force Message Key Equality (OR)

G8.1.1.1.1.1. Chosen Tag Challenge Attack (AND)

G8.1.1.1.1.1.1. Reprogram or Emulate TAGs (* G8.2.1.2.1)

G8.1.1.1.1.1.2. Choose Tag Challenge to Force Desired Message Key (OR)

G8.1.1.1.1.1.2.1. Hack App. RNG Values in high 16 bits (OR)

G8.1.1.1.1.1.2.1.1. Find app. boxes with flawed PRNGs. Countermeasure: Design PRNG properly. Cost to defeat: none.

G8.1.1.1.1.1.2.1.2. Actively attack app. box PRNG. Countermeasure: Design PRNG properly. Cost to defeat: moderate.

G8.1.1.1.1.1.2.2. Wait Out Right 16 bits. Cost to defeat: low, but not practical.

G8.1.1.1.2. Find Collision-MACs for Diff. Challenges. Countermeasure: Design

MAC and protocol properly. Cost to Defeat: Unknown, est. Medium-High.

G8.1.1.2. Keep TAG off Hotlist (OR)

G8.1.1.2.1. Subvert site long-term (keeper of hotlist) Cost: High; Risk: High.

G8.1.1.2.2. Alter hotlist on-site at application box. Countermeasure: Don't allow tampering with application box's memory. Cost to Defeat: Moderate.

G8.1.1.2.3. Alter hotlist in transit. Countermeasure: Digitally sign hotlist. Cost to Defeat: Very High.

G8.1.1.2.4. Alter hotlist on-site at center. Countermeasure: Physical and policy security at system. Cost to Defeat: Moderate; Risk: High.

G8.1.1.2.5. Hack applications to bypass hotlist check.

G8.1.1.2.6. Alter messages back to center from application boxes in transit. Countermeasure: Digitally sign transmissions. Cost to Defeat: Very High.

G8.2. Replay Partial Valid Transactions (AND)

G8.2. 1. Get Partial Replay to Work in Real Time (OR)

G8.2.1.1. Replay recharges into tag

G8.2.1.2. Tag Key-Recovery Attack (AND)

G8.2.1.2.1. Reprogram or Emulate Tags (OR)
G8.2.1.2.1.1. Learn to reprogram tags.
G8.2.1.2.1.2. Learn to emulate tags. (AND)
G8.2.1.2.1.2.1. Learn details of how tags work. (OR)
G8.2.1.2.1.2.1.1. Bribe someone in the know. Cost: Moderate; Risk: High
G8.2.1.2.1.2.1.2. Steal plans from Manufacturer. Cost: Medium-High; Risk: High
G8.2.1.2.1.2.1.3. Reverse-engineer tags. Cost: Medium-High; Risk: None
G8.2.1.2.1.2.2. Find a cost-effective substitute for the tags. Cost: Unknown, probably Moderate.
G8.2.1.2.2. Recover Internal Tag Keys (OR)
G8.2.1.2.2.1. Cryptanalytic Attack on MAC and Protocol Cost: Unknown, est. Medium High.
G8.2.1.2.2.2. Reverse-engineer Tag. Cost: Medium.
G8.2.1.3. Protocol Patching Attack (AND)
G8.2.1.3.1. Learn Communications Protocol Cost: Low
G8.2.1.3.2. Find a cost-effective way to patch new messages into the protocol. Cost: Unknown, est. Medium-High.
G8.2.1.3.3. Get the application box to accept the patched protocol message.
G8.2.1.3.3.1. Find a way to patch the MAC of one message to be equal to that of another, without knowledge of the message key. Cost: Unknown, est. High.
G8.2.1.3.3.2. Known key MAC collision attack. (AND)
G8.2.1.3.3.2.1. Find a way to patch the MAC of one message to be the same as another. Cost: Unknown, est. High.
G8.2.1.3.3.2.2. Learn tag internal keys for all serial numbers used. (OR)
G8.2.1.3.3.2.2.1. Attack G8.2.1.3.3.2.2.1. (AND)
G8.2.1.3.3.2.2.1.1. Recover tag key from tag
G8.2.1.3.3.2.2.1.2. Learn key generation mechanism.
G8.2.1.3.3.2.2.1.3. Only use one serial number
G8.2.1.3.3.2.2.2. Attack G8.2.1.3.3.2.2.2. (AND)
G8.2.1.3.3.2.2.2.1. Recover application key.
G8.2.1.3.3.2.2.2.2. Capture many serial numbers.
G8.2.1.3.3.2.2.2.3. Use many serial numbers.
G8.2.1.3.3.2.2.2.4. Learn key generation mechanism.
G8.2.1.3.4. Avoid hotlist problems (OR)
G8.2.1.3.4.1. Keep the tag off Hotlist (* G8.1.1.2)
G8.2.1.3.4.2. Patch the serial number, too.
G8.2.2. Keep tag off Hotlist (* G8.1.1.2).

An asterisk "*" means that the node was previously expanded elsewhere. In the above attack tree, node G8.2.1.3.4.1 is the same as node G8.1.1.2. This node has six children, but instead of writing them in both places, they are only listed on the tree once, after node G8.1.1.2.

Alternatively, the nodes G8.1.1.2.1, G8.1.1.2.2, G8.1.1.2.3, G8.1.1.2.4, G8.1.1.2.5, and G8.1.1.2.6 can be viewed as having multiple parent nodes: G8.1.1.2, G8.2.1.3.4.1, and G8.2.2.

D. Applications of Attack Tree Analysis

1. Using an Attack Tree to Determine the Vulnerability of a System Against an Attack After building an attack tree, an analyst can look at the value of the root node to see if the system described is vulnerable to attack, e.g., the presence of a possible Boolean value or an attacker's cost below a certain threshold. The analyst can also use the procedures described in the previous section to determine if the system is vulnerable to a particular type of attack, e.g., password guessing attacks, legal attacks, unskilled attacks, etc.

2. Using an Attack Tree to List the Security Assumptions of a System

The attack tree of this invention can also be used to provide a comprehensive list of the assumptions of a security system (e.g., the security of this system assumes that no one can successfully bribe the president of our corporation). To generate such a list, the analyst need only direct tree analysis software 290 to print out the node descriptors and their associated values.

3. Using an Attack Tree to Determine the Impact of a System Modification

It was seen previously that the basic attributes of the system are defined and quantified as leaf node inputs and logic node operations. Thus, changes in attacks, countermeasures, security subsystems, business models, and any other modifications can be analyzed by simply changing (or adding, as necessary) the relevant leaf nodes (and any affected logic nodes). Thus, to determine the impact of a new attack (a new technology, for example) on the overall security of a system:

1) Calculate the value of the root node of an attack tree using the procedures defined previously.
2) Incorporate the new attack by adding new leaf nodes to the attack tree, or revise the values of existing leaf nodes.
3) Modify the logic nodes, if necessary.
4) Calculate the new value of the root node using these new and revised leaf and logic nodes.
5) Compare the value of the root node obtained in step (1) with the value obtained in step (4). The difference in values represents the impact of the modification.

In a similar manner, different attack (or defense) scenarios can be compared and ranked (based on their respective root node values) in order of most likely to succeed.

4. Modular or Compartmentalized Security Analysis

Where the modifications or alternatives to be analyzed are extensive or complex, it is useful to consider systems as being made up of subsystems; the invention provides a methodology for evaluating the security of a subsystem (either an attack or a countermeasure) and then plugging that evaluation into the evaluation of the larger system. For example, an attack tree whose goal is to successfully listen to a conversation could be plugged into node G1.1.2.4.1 in the attack tree above.

As yet another sample attack tree, the following is an attack tree against Pretty-Good Privacy (PGP), a popular electronic-mail security program for computers:

G9: Read a message encrypted with PGP (OR)
G9.1. Decrypt message (OR)
G9.1.1. Obtain private key of recipient (OR)
G9.1.1.1. Break RSA encryption (OR)
G9.1.1.1.1. Factor RSA modulus
G9.1.1.1.2. Cryptanalyze RSA
G9.1.1.2. Get private key from key ring (AND)
G9.1.1.2.1. Obtain encrypted private key ring (OR)
G9.1.1.2.1.1. Copy it off user's hard drive
G9.1.1.2.1.2. Copy it off backup tapes
G9.1.1.2.1.3. Monitor network traffic
G9.1.1.2.2. Decrypt private key (OR)
G9.1.1.2.2.1. Break IDEA encryption (OR)
G9.1.1.2.2.1.1. Brute-force IDEA G9.1.1.2.2.1.2. Cryptanalysis of IDEA
G9.1.1.2.2.2. Learn passphrase (OR)
G9.1.1.2.2.2.1. Monitor keyboard when user types in passphrase
G9.1.1.2.2.2.2. Convince user to reveal passphrase
G9.1.1.2.2.2.3. Guess passphrase
G9.1.1.3. Monitor user computer's memory
G9.1.2. Determine symmetric encryption key (OR)
G9.1.2.1. Monitor sender computer's memory
G9.1.2.2. Monitor receiver computer's memory
G9.1.2.3. Determine key from random number generator (OR)
G9.1.2.3.1. Determine state of random number pool when key is generated
G9.1.2.3.2. Run software which tries to make the random number pool deterministic
G9.1.2.4. Break IDEA encryption
G9.2. Convince sender to encrypt message in public key where private key is known This attack tree G9 might be part of (a sub-tree or subsystem attack tree) a larger attack tree G10, below; the entire attack tree G9 hangs off node G10.4.2.

G10: Read a specific message that has been sent from one Windows 95 computer to another.
G10.1. Convince sender to reveal message (OR)
G10.1.1. Bribe user
G10.1.2. Blackmail user
G10.1.3. Threaten user
G10.1.4. Fool user
G10.2. Read message when it is being entered into the computer (OR)
G10.2.1. Monitor electromagnetic emanations from computer screen (Countermeasure: use a TEMPEST computer)
G10.2.2. Visually monitor computer screen
G10.3. Read message when it is being stored on sender's disk (Countermeasure: use SFS to encrypt hard drive) (AND)
G10.3.1. Get access to hard drive (Countermeasure: Put physical locks on all doors and windows)
G10.3.2. Read a file protected with SFS
G10.4. Read message when it is being sent from sender to recipient (Countermeasure: use PGP) (AND)
G10.4.1. Intercept message in transit (Countermeasure: Use transport-layer encryption program.)
G10.4.2. Read message encrypted with PGP
G10.5. Convince recipient to reveal message (OR)
G10.5.1. Bribe user
G10.5.2. Blackmail user
G10.5.3. Threaten user
G10.5.4. Fool user
G10.6. Read message when it is being read (OR)
G10.6.1. Monitor electromagnetic emanations from computer screen (Countermeasure: use a TEMPEST computer)
G10.6.2. Visually monitor computer screen
G10.7. Read message when it is being stored on receiver's disk (OR)
G10.7.1. Get stored message from user's hard drive after decryption (Countermeasure: use SFS to encrypt hard drive) (AND)
G10.7.1.1. Get access to hard drive (Countermeasure: Put physical locks on all doors and windows)
G10.7.1.2. Read a file protected with SFS
G10.7.2. Get stored message from backup tapes after decryption
G10.8. Get paper printout of message (Countermeasure: store paper copies in safe) (AND)
G10.8.1. Get physical access to safe
G10.8.2. Open the safe Attack tree G10 can also have other subsystem attack trees attached to it: the one against TEMPEST computers, the one against the SFS hard-disk encryption program, the one protecting message interception in transit, the one against protections of physical access to the sender's and receiver's hard drive, etc. Even the attack tree G1, opening a safe, could attach to node G10.8.2 in the tree above.

It is likely that any real system that uses attack trees will have several hundred standard attack trees that can be plugged into larger attack trees as required. For example, attack trees against common subsystems (car alarms, for example) can be developed for modular re-use. The use of subsystem attack trees also allows compartmentalized or hierarchical security, where people can work on sections of the tree without knowing anything about the rest of the tree. Subsystem trees also facilitate the consideration of unknown attacks, described previously. People can work on a part of an attack tree that might not be able to connect to the main tree, anticipating a day when it might. For example, a section of an attack tree against a military installation might require the help of an insider. Even if there is no insider, that branch of the attack tree could still be developed. Then, if an insider is found, the thinking on possible attacks has already been reflected in the attack tree.

5. Combining Two Instances of the Same Attack Tree with Different Attributes

It was seen above that node values can take either Boolean or continuous values. Where a pair of trees is constructed, one Boolean-valued and the other continuous-valued, they can be combined to give increased analytical capabilities.

For example, attack tree G11 is the attack tree against PGP (G9, above), with the cost to execute the attack associated with each node (note that these values are not necessarily accurate, but are here for purposes of illustration only). The costs for the interior nodes has already been calculated from the leaf nodes using the process described in FIGS. 5 and 7.

G11: Read a message encrypted with PGP [$25K] (OR)
G11.1. Decrypt message [$25K] (OR)
G11.1.1. Obtain private key of recipient [$25K] (OR)
G11.1.1.1 . Break RSA encryption [$100M] (OR)
G11.1.1.1.1. Factor RSA modulus [$100M]
G11.1.1.1.2. Cryptanalyze RSA [$250M]
G11.1.1.2. Get private key from key ring [$30K] (AND)
G11.1.1.2.1. Obtain encrypted private key ring [$10K] (OR)
G11.1.1.2.1.1. Copy it off user's hard drive [$10K]
G11.1.1.2.1.2. Copy it off backup tapes [$10K]
G11.1.1.2.1.3. Monitor network traffic [$20K]
G11.1.1.2.2. Decrypt private key [$20K] (OR)
G11.1.1.2.2.1. Break IDEA encryption [$100M] (OR)
G11.1.1.2.2.1.1. Brute-force IDEA [$150M]
G11.1.1.2.2.1.2. Cryptanalysis of IDEA [$100M]
G11.1.1.2.2.2. Learn passphrase [$20K] (OR)
G1.1.1.2.2.2.1. Monitor keyboard when user types in passphrase [$25K]

G11.1.1.2.2.2.2. Convince user to reveal passphrase [$100K]

G11.1.1.2.2.2.3. Guess passphrase [$20K]

G11.1.1.3. Monitor user computer's memory [$20K]

G11.1.2. Determine symmetric encryption key [$25K] (OR)

G11.1.2.1. Monitor sender computer's memory [$25K]

G11.1.2.2. Monitor receiver computer's memory [$25K]

G11.1.2.3. Determine key from random number generator [$35K] (OR)

G11.1.2.3.1. Determine state of random number pool when key is generated [$100M]

G11.1.2.3.2. Run software which tries to make the random number pool deterministic [$35K]

G11.1.2.4. Break IDEA encryption [$100M]

G11.2. Convince sender to encrypt message in public key where private key is known [$50K]

Similarly, G12 is the same attack tree, with each node labeled with the Boolean node values of either intrusive [I] or non-intrusive [N]:

G12: Read a message encrypted with PGP (OR)

G12.1. Decrypt message (OR)

G12.1.1. Obtain private key of recipient (OR)

G12.1.1.1. Break RSA encryption (OR)

G12.1.1.1.1. Factor RSA modulus [N]

G12.1.1.1.2. Cryptanalyze RSA [N]

G12.1.1.2. Get private key from key ring (AND)

G12.1.1.2.1. Obtain encrypted private key ring (OR)

G12.1.1.2.1.1. Copy it offuser's hard drive [I]

G12.1.1.2.1.2. Copy it off backup tapes [I]

G12.1.1.2.1.3. Monitor network traffic [I]

G12.1.1.2.2. Decrypt private key (OR)

G12.1.1.2.2.1. Break IDEA encryption (OR)

G12.1.1.2.2.1.1. Brute-force IDEA [N]

G12.1.1.2.2.1.2. Cryptanalysis of IDEA [N]

G12.1.1.2.2.2. Learn passphrase (OR)

G12.1.1.2.2.2.1. Monitor keyboard when user types in passphrase [I]

G12.1.1.2.2.2.2. Convince user to reveal passphrase [I]

G12.1.1.2.2.2.3. Guess passphrase [N]

G12.1.1.3. Monitor user computer's memory [I]

G12.1.2. Determine symmetric encryption key (OR)

G12.1.2.1. Monitor sender computer's memory [I]

G12.1.2.2. Monitor receiver computer's memory [I]

G12.1.2.3. Determine key from random number generator (OR)

G12.1.2.3.1. Determine state of random number pool when key is generated [I]

G12.1.2.3.2. Run software which tries to make the random number pool deterministic [I]

G12.1.2.4. Break IDEA encryption [N]

G12.2. Convince sender to encrypt message in public key where private key is known [I]

If we were only interested in non-intrusive attacks, information from attack trees G11 and G12 can be combined into a single, smaller, attack tree by comparing the trees, node by node, and deleting those nodes in G11 that do not appear as [I] nodes in G12. Alternatively, this is equivalent to making the costs of each intrusive attack infinite. Then, any AND operation on such a cost and another operand gives an infinite cost, and any OR operation on such a cost and another operand gives the other operand. Such operations are easily implemented within tree analysis software 290. The result can be depicted as attack tree G13:

G13: Read a message encrypted with PGP: Non-intrusive attacks only [$100M] (OR)

G13.1. Decrypt message [$100M] (OR)

G13.1.1. Obtain private key of recipient [$100M]

G13.1.1.1. Break RSA encryption [$100M] (OR)

G13.1.1.1.1. Factor RSA modulus [$100M]

G13.1.1.1.2. Cryptanalyze RSA [$250M]

G13.1.2. Determine symmetric encryption key [$100M]

G13.1.2.1. Break IDEA encryption [$100M] (OR)

G13.1.2. 1.1. Brute-force IDEA [$150M]

G13.1.2.1.2. Cryptanalysis of IDEA [$100M]

It is easy to see that the cost to break PGP is much greater if an attacker is restricted to non-intrusive attacks only.

6. Multi-Valued Nodes

The above examples of 1) attack sub-trees and 2) multiple instances of attack trees with different attributes illustrate two possible ways in which tree nodes can represent more than one attribute. Another, more direct, way involves the use of vector-valued nodes instead of (or in addition to) the scalar-valued nodes discussed previously. A vector-valued node can be expressed in the form $X=[x_1 x_2, \ldots, x_n,]$ where $x_1, x_2, \ldots, x_n$ are scalar components of the vector X. Those skilled in the art will appreciate that the previously described algebraic, Boolean, relational and other functionality can be generalized to vector-valued nodes in accordance with well-understood principles of vector algebra as necessary to represent the desired security model. For example, $$X+Y=[x_1+y_2, x_2+y_2, \ldots, x_n+y_n] \text{ (vector addition)}$$

$$X \cdot Y=[x_1y_1+x_2y_2+\ldots, x_ny_n] \text{ (scalar product of 2 vectors)}$$

7. Best Allocation of a Security Budget

It is easily seen that the above-mentioned attack trees can be used to determine the best allocation of a security budget. For example, it is computationally straightforward to determine all possible combinations of attacks (and/or countermeasures) whose total cost comes in under a predetermined budget. Then the different scenarios can be analyzed using the attack tree methodology and their root node values can be compared to determine the most cost-effective implementation. When used in connection with multi-valued nodes, multiple instances of an attack tree with the same attributes, or vector-valued nodes, even more information can be obtained. For example, a cost-risk spectrum could be calculated whereby the user could choose the lowest cost system that still met an acceptable level of risk (e.g., expressed as a probability of successful attack or defense).

The method and apparatus of the present invention has many applications covering numerous variations and modifications to the exemplary embodiments described herein, as would be known by one skilled in the art. Thus, it is intended that the scope of the present invention be limited only with regard to the claims listed below.

What is claimed is:

1. A computer-implemented method for evaluating the security of a system, comprising the steps of:

(a) receiving an identifier of a particular system to be evaluated;

(b) storing in a computer-readable medium a logic tree data structure representing a security model which corresponds to the selected information protection system, said logic tree including:

(i) a plurality of leaf nodes, each of which represents a particular security attribute of the selected system, (ii) a root node representing an overall indication of the security of the system and (iii) at least one intermediate node located between said leaf nodes and said root node, said intermediate node representing a logical relationship between at least two of said particular security attributes; and (c) receiving values for said leaf nodes quantifying said attributes;

(d) computing a value of said root node that provides an indication of the overall security of the system.

2. The method of claim 1 where said attribute is Boolean-valued.

3. The method of claim 2 where said attribute is continuous-valued.

4. The method of claim 3 where said value is a cost associated with said security attribute.

5. The method of claim 4 where said cost corresponds to a particular attack.

6. The method of claim 4 where said cost corresponds to defending against a particular attack.

7. The method of claim 3 where said attribute is a time associated with said security attribute.

8. The method of claim 1 where said attribute indicates a likelihood of occurrence of said security attribute.

9. The method of claim 8 where said value indicates a probability of occurrence of said security attribute.

10. The method of claim 9 where said security attribute pertains to a particular attack.

11. The method of claim 9 where said security attribute pertains to defending against a particular attack.

12. The method of claim 9 where said probability reflects an attacker's awareness of said particular attack.

13. The method of claim 1 where at least one of said nodes also reflects a countermeasure.

14. The method of claim 13 where said node containing said countermeasure is a leaf node.

15. The method of claim 13 where said node containing said countermeasure is an intermediate node.

16. The method of claim 13 where said node containing said countermeasure points to a separate attack tree against that countermeasure.

17. The method of claim 1 where at least one of said logical relationships includes an algebraic relationship.

18. The method of claim 1 where at least one of said logical relationships is expressed with a relational operator.

19. The method of claim 1 where at least one of said logical relationships includes a Boolean relationship.

20. The method of claim 1 where at least one of said nodes has children representing different possible attacks against the node.

21. The method of claim 20 where said at least one of said nodes reflects a minimum of said children's values.

22. The method of claim 1 where at least one of nodes has children representing different parts of a single attack against said node.

23. The method of claim 22 where said at least one of said nodes reflects a sum of its children's values.

24. The method of claim 22 where said at least one of said nodes reflects a value exhibited by all of its children.

25. The method of claim 1 where said root node indicates the overall attackability of said system.

26. The method of claim 25 where said value of said root node represents a cost to attack said system.

27. The method of claim 25 where said value of said root node represents a probability of attacking said system.

28. The method of claim 1 where said root node indicates an overall defendability of said system.

29. The method of claim 28 where said value of said root node indicates a cost to de fend said system.

30. The method of claim 28 where said value of said root node indicates a probability of defending said system.

31. The method of claim 1 where at least one of said nodes represents a plurality of attributes.

32. The method of claim 31 where said attributes are represented directly by said at least one node.

33. The method of claim 32 where said attribute of said at least one node is vector-valued.

34. The method of claim 31 where said plurality of attributes are represented by a sub-tree structure.

35. The method of claim 1 where at least one of said nodes represents an attack about which there is currently no information.

36. The method of claim 1 where said value of at least one said leaf nodes is propagated through said intermediate nodes to said root node.

37. The method of claim 1 where said security attribute pertains to the safety of said system.

38. The method of claim 1 where said security attribute pertains to the reliability of said system.

39. A computer-readable medium storing a logic data tree structure comprising:

(a) a plurality of leaf nodes, each of which represents a particular security attribute of a system;

(b) a root node representing an overall indication of the security of said system; and (c) at least one intermediate node located between said leaf nodes and said root node, said intermediate node representing a between at least two of said particular security attributes; and said leaf nodes having values quantifying said attributes whereby a value of said root node provides said indication of said security of said system for use in evaluating said security of said system.

40. The computer-readable medium of claim 39 wherein said attribute is Boolean-valued.

41. The computer-readable medium of claim 40 wherein said attribute is continuous-valued.

42. The computer-readable medium of claim 41 wherein said value is a cost associated with said security attribute.

43. The computer-readable medium of claim 42 wherein said cost corresponds to a particular attack.

44. The computer-readable medium of claim 42 wherein said cost corresponds to defending against a particular attack.

45. The computer-readable medium of claim 41 wherein said attribute is a time associated with said security attribute.

46. The computer-readable medium of claim 39 wherein said attribute indicates a likelihood of occurrence of said security attribute.

47. The computer-readable medium of claim 46 wherein said value indicates a probability of occurrence of said security attribute.

48. The computer-readable medium of claim 47 wherein said security attribute pertains to a particular attack.

49. The computer-readable medium of claim 47 wherein said security attribute pertains to defending against a particular attack.

50. The computer-readable medium of claim 47 wherein said probability reflects an attacker's awareness of said particular attack.

51. The computer-readable medium of claim 39 wherein at least one of said nodes also reflects a countermeasure.

52. The computer-readable medium of claim 51 wherein said node containing said countermeasure is a leaf node.

53. The computer-readable medium of claim 51 wherein said node containing said countermeasure is an intermediate node.

54. The computer-readable medium of claim 51 wherein said node containing said countermeasure points to a separate attack tree against that countermeasure.

55. The computer-readable medium of claim 39 wherein at least one of said logical relationships includes an algebraic relationship.

56. The computer-readable medium of claim 38 wherein at least one of said logical relationships is expressed with a relational operator.

57. The computer-readable medium of claim 39 wherein at least one of said logical relationships includes a Boolean relationship.

58. The computer-readable medium of claim 39 wherein at least one of said nodes has children representing different possible attacks against the node.

59. The computer-readable medium of claim 58 wherein said at least one of said nodes reflects a minimum of said children's values.

60. The computer-readable medium of claim 39 wherein at least one of nodes has children representing different parts of a single attack against said node.

61. The computer-readable medium of claim 60 wherein said at least one of said nodes reflects a sum of its children's values.

62. The computer-readable medium of claim 60 wherein said at least one of said nodes reflects a value exhibited by all of its children.

63. The computer-readable medium of claim 39 wherein said root node indicates the overall attackability of said system.

64. The computer-readable medium of claim 63 wherein said value of said root node represents a cost to attack said system.

65. The computer-readable medium of claim 63 wherein said value of said root node represents a probability of attacking said system.

66. The computer-readable medium of claim 39 wherein said root node indicates an overall dependability of said system.

67. The computer-readable medium of claim 65 wherein said value of said root node indicates a cost to defend said system.

68. The computer-readable medium of claim 65 wherein said value of said root node indicates a probability of defending said system.

69. The computer-readable medium of claim 39 wherein at least one of said nodes represents a plurality of attributes.

70. The computer-readable medium of claim 69 wherein said attributes are represented directly by said at least one node.

71. The computer-readable medium of claim 70 wherein said attribute of said at least one node is vector-valued.

72. The computer-readable medium of claim 69 wherein said plurality of attributes are represented by a sub-tree structure.

73. The computer-readable medium of claim 39 wherein at least one of said nodes represents an attack about which there is currently no information.

74. The computer-readable medium of claim 39 wherein said value of at least one said leaf nodes is propagated through said intermediate nodes to said root node.

75. The computer-readable medium of claim 38 wherein said security attribute pertains to the safety of said system.

76. The computer-readable medium of claim 38 wherein said security attribute pertains to the reliability of said system.

* * * * *